United States Patent [19]

Yamazaki

[11] Patent Number: 5,762,792

[45] Date of Patent: Jun. 9, 1998

[54] FILTER

[75] Inventor: Kazuhiko Yamazaki, Kanagawa, Japan

[73] Assignee: Yamashin Filter Manufacturing Corp., Yokohama, Japan

[21] Appl. No.: 665,224

[22] Filed: Jun. 18, 1996

[51] Int. Cl.$^6$ .................................................. B01D 27/06
[52] U.S. Cl. .................... 210/323.2; 210/440; 210/487; 210/493.1; 210/497.01
[58] Field of Search .................... 210/323.2, 346, 210/347, 493.1, 493.5, 323.1, 487, 497.01, 493.2, 493.3, 440

[56] References Cited

U.S. PATENT DOCUMENTS 3,283,904  11/1966  Buckmann et al. ............... 210/493.1

FOREIGN PATENT DOCUMENTS 4-356598  12/1992  Japan .
5-26120   4/1993   Japan .

*Primary Examiner*—Matthew O. Savage
*Attorney, Agent, or Firm*—Brinks Hofer Gilson & Lione

[57] ABSTRACT

This invention pertains to a filter in general and particularly to a filter for use in filtering hydraulic oil circulating in a hydraulic system provided for a hydraulic machine. The filter is formed in a loop and includes at least two filtering materials having different filtration porosities. Those filtering materials are arranged in the circumferential direction of the loop. Since filtering materials are arranged in the circumferential direction, the filter can be manufactured at the same size as the existing filters so that it can be accommodated in the existing filter cases. Also, since the filter has more than one filtration accuracies, it is capable of catching impurities of various sizes. In operation, most of the liquid to be filtered tends to pass through the less fine filtration martial. Thus, the filter creates a small pressure loss.

14 Claims, 2 Drawing Sheets

FILTER

FIELD OF THE INVENTION

This invention pertains to a filter in general and particularly to a filter for use in filtering hydraulic oil circulating in a hydraulic system provided for a hydraulic machine.

BACKGROUND OF THE INVENTION

A filtration device for use in a hydraulic system has a filter of a cylindrical shape. The filter is made of a surface-filtering material, such as filtration paper, and catches solid impurities in hydraulic oil in its surface when the oil passes through the filter.

Conventionally, such a filter is made of a single filtering material (prior art 1). Generally, the performance of a filtering material is evaluated based on three factors: filtration capability; pressure loss; and pressure drop. Filtration capability indicates how fine impurities a filtering material can filter out and is defined by the size of pores in the material. Thus, the filtration capability of a filtering material denotes the minimum size of impurities that the material can catch. In other words, a filtering material with a finer filtration capability, i.e., a finer filtration material, can filter out smaller impurities. Pressure drop indicates a difference in oil pressure between the upstream and downstream of the filtering material. Useful life indicates how long a filter material can be used and is usually measured by an increase in pressure drop across the filtering material. These three factors are not independent but are related to one another. For instance, a finer filtration material gives rise to a greater pressure drop and has a shorter useful life. Since the conventional filter is made of a single filtering material, it is difficult to balance those competing factors. In addition, it is expensive to construct the entire part of a filter with a fine filtration material. Also, when a filtration capability needs to be changed, the filter element must be replaced with another filter element having a desired filtration capability. This replacement work is time consuming.

A filtration device of another conventional type (prior art 2) is used in the full-flow filtration method. Such a conventional filtration device has a main filter formed of a filtering material with a medium filtration capability and a bypass filter formed of a filtering material with a fine filtration capability. In this filtration device, most of the oil flows through the main filter. The remaining oil (normally, less than 1/100 of the total filtration flow) branches from the hydraulic circuit and flows through the bypass filter for fine filtration. Since most of the oil flows though the medium filtration filter, the overall pressure loss is small. In addition, fine impurities are eventually caught by the bypass filter while circulating several times in the hydraulic system. However, the installation of the bypass filter requires a special filter case and piping, which make the initial cost very high. In hydraulic systems for motor vehicles, an installation space for the bypass filter is sometimes not available.

This filtration device has a cylindrical filter consisting of two cylindrical filtering materials arranged coaxially. One cylinder is shorter and has a finer filtration capability than the other. In one embodiment, the shorter cylinder is larger in diameter and fit around the outer surface of the longer one. Thus, those two cylinders are laid to overlap each other in the radial direction at one end of the longer cylinder. In another embodiment, those two cylinders are equal in diameter and connected side by side along their axis. However, overlapping one cylinder with the other or connecting the two cylinders requires a special technique. Since the filter is larger in diameter or longer than the ordinary filters, it cannot be accommodated in the existing filter cases.

SUMMARY OF THE INVENTION

It is an object of this invention to provide a filter of a simple construction while capable of removing fine impurities without causing a large pressure loss. It is a further object of this invention to provide a filter of the same size as the existing filters so that it can be accommodated in the existing filter cases.

To achieve the above objects, the filter of the present invention is formed in a loop and includes at least two filtering materials having different filtration porosities. Those filtering materials are arranged in the circumferential direction of the loop. Since filtering materials are arranged in the circumferential direction, the filter can be manufactured at the same size as the existing filters so that it can be accommodated in the existing filter cases. Also, since the filter has more than one filtration porosity, it is capable of catching impurities of various sizes.

The filtration porosity of each filtering material and the ratio of the area it occupies with respect to the entire filtration area are determined based on how the filter will be used. In a particular embodiment for hydraulic systems, the filter consists of two filtering materials. One material has a filtration porosity of more than 20 µm; the other material has a filtration porosity of less than 6 µm and occupies 10%–30% of the entire filtration area. In operation, most of the oil flows through the less fine filtration. Therefore, the filter creates a low pressure loss. Fine impurities which escape the less fine filtration material are eventually caught by the finer filtration material while circulating several time in the system.

The filter of this invention may be made of a sheet material and folded in pleats to increase the filtration area of the filter. The material may be filtration paper, synthetic resin fibers or cotton.

The invention, together with further objects and advantages, will best be understood by reference to the following detailed description of the preferred embodiment of the invention, taken in conjunction with the accompanying drawings.

DETAILED DESCRIPTION OF THE INVENTION

Figure 2:
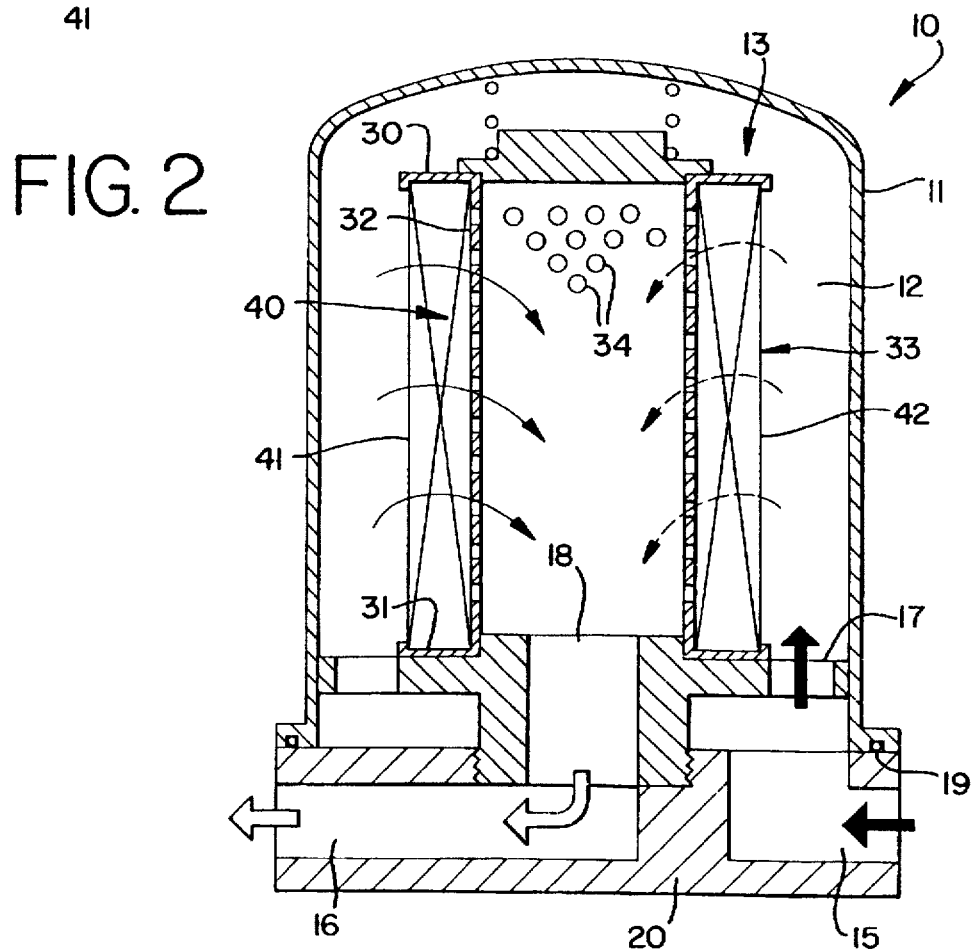
FIG. 2 is a cross-sectional view showing a filtration device in which the filter element shown in FIG. 1 is used.
Figure 3:
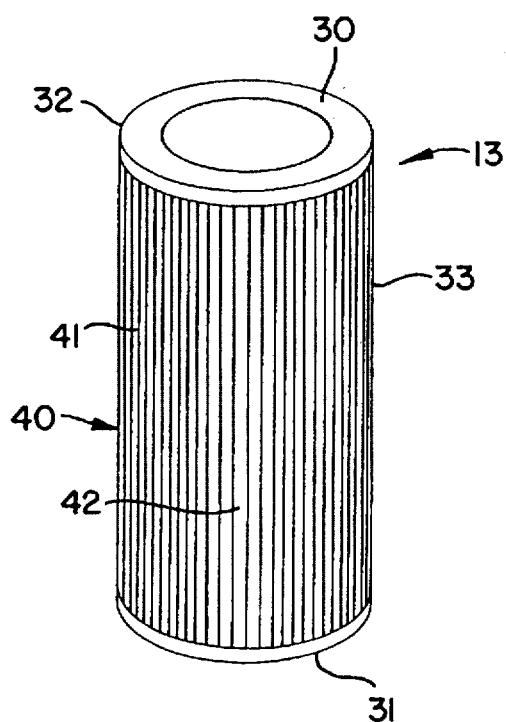
FIG. 3 is a perspective view showing the filter element of FIG. 1.

Referring now to the attached drawings, FIG. 2 shows a filtration device 10 having a filter case 11, a filter storage 12 provided inside the filter case 11 and a filter element 13 placed in the filter storage 12. This filter device 10 is used in a hydraulic system provided for a hydraulic machine (not shown) for filtering hydraulic oil (e.g. mineral oil).

The filter case 11 has an inlet pipe 15 into which oil enters and an outlet pipe 16 from which the oil exits. The inlet pipe 15 communicates with the filter storage 12 via a flow-in-port 17. The filter storage 12 communicates with the outlet pipe 16 via a flow-out port 18. A seal 19 is provided between the filter case 11 and a base member 20 to close them in a liquid-tight manner.

A relief valve that opens when the filter element 13 is clogged may be provided between the inlet pipe 15 and the outlet pipe 16 for bypassing the liquid between the inlet pipe 15 and the outlet pipe 16.

The filter element 13 is composed of a cylindrical frame 32 with end plates 30 and 31 and a folded-sheet filter 33. A number of holes 34 (only a part of such holes are shown) are provided for the frame 32 so that the oil introduced to the filter storage 12 can flow into the outlet pipe 16 via the flow-out port 18 after passing through the filter 33.

Figure 1:
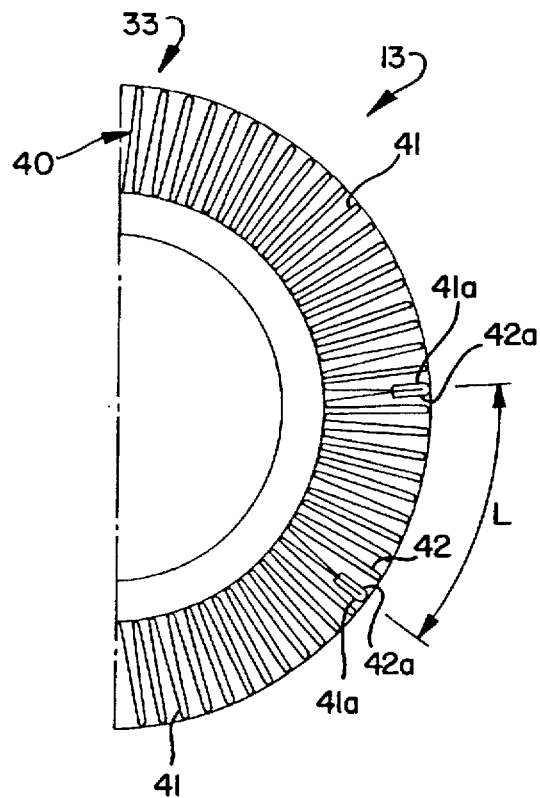
FIG. 1 is a plain view showing a half of the filter element in accordance with this invention.
Figure 4:
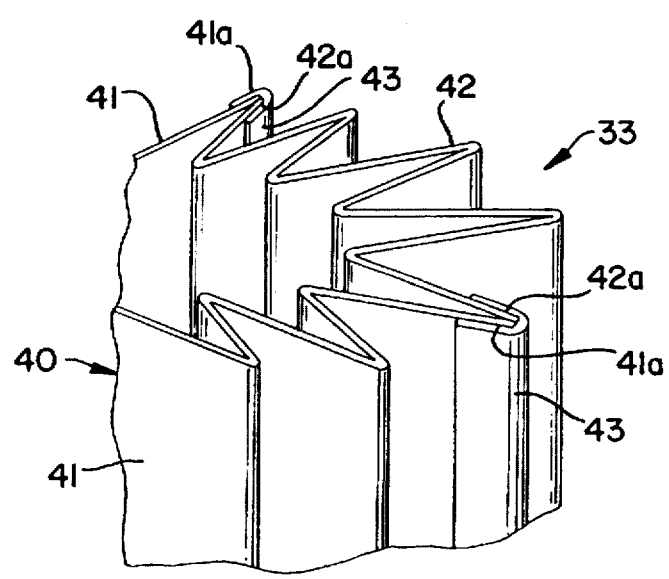
FIG. 4 is a perspective view showing the filter included in the filter element shown in FIG. 1.

As shown in FIG. 1, the filter 33 is formed of a sheet-like filtering material, such as filter paper. The filtering material is folded in pleats and wound in a cylindrical shape. This filter 33 is composed of two filtering materials 41 and 42 having different filtration. The filtration porosity of the first filtering material 41 is less fine than that of the second filtering material 42. Those two material 41 and 42 are arranged in the circumferential direction of the filter 33. The letter "L" in FIG. 1 indicates the range across which the second filter material 42 is provided. As shown in FIG. 4, the filtering materials 41 and 42 are bound together at ends 41a and 42a by binding sheets 43 made of filter paper.

The filtration porosity of the first filtering material 41 is approximately 30 µm. The filtration porosity of the second filtering material 42 is approximately 6 µm or 3 µm or 1 µm. The area ratio of the second filtering material 42 is approximately 20%. Thus, the second filtering material 42 occupies approximately 20% of the entire filtration area of the filter 33.

Experiments using a hydraulic system (return hydraulic system) have shown that the filter 33 exhibits preferable results in terms of both filtration porosity and pressure loss when the first filtering material has a filtration porosity of between about 20 µm and 50 µm and the second filtering material has an area ratio of between about 10% and 30%.

The filtering materials 41 and 42 are made mainly of paper pulp, but other materials, such as synthetic resin fibers and cotton, may also be used. The filtration porosities of the filtering materials 41 and 42 can be varied by changing the base material of the filtering materials (e.g. by reducing the fiber diameter of the filtering materials). The filter 33 may include three or more filtering materials having different filtration porosities arranged in the circumferential direction in such a manner as described above.

When the filter device 10 is functioning normally, the oil enters from the inlet pipe 15 into the filter case 11 as shown by the arrow in FIG. 2, then passes through the filter element 13 and exits from the outer pipe 16 via the flow-out port 18. In operation, the oil passes in part through the finer filtration material 42 remove fine solid impurities. The remaining oil passes through the less fine filtration material 41 to remove solid impurities of sizes larger than that indicated by its filtration porosity. Since most of the oil passes through the less fine filtration material 41, a pressure loss is small. The fine solid impurities which escape the less fine filtration material 41 are eventually caught by the finer filtration material 42 after the oil circulates a few times through this element 13.

Since the filter 33 is composed of two filtering materials 41 and 42, it has two binding sections. Thus, the filter 33 has only one extra binding section compared to the conventional filters composed of one filtering material. Therefore, it can be manufactured much more inexpensively than the filter element disclosed by the prior art 3.

Also, even when used in a full-flow-type hydraulic circulation system, the filter 33 of this embodiment can greatly reduce contamination without increasing pass-resistance by properly adjusting the area ratio of the filtering materials 41 and 42.

Although the present invention has been described in detail by way of illustration and example, it should be understood that a wide range of changes and modifications can be made to the preferred embodiment described above without departing in any way from the scope and spirit of the invention.

I claim:

1. A filter formed in the shape of a loop for filtering hydraulic oil circulating in a hydraulic system comprising a first filtering material surrounding a first portion of a central axis and having a pair of opposite edges extending axially with respect to said central axis, a second filtering material surrounding a remaining portion of said central axis and having a pair of opposite edges extending axially with respect to said central axis, first means for connecting one of the opposite edges of said first filtering material to one of the opposite edges of said second filter material, and second means for connecting the other opposite edge of said first filter material to the other opposite edge of said second filtering material to form a continuous loop of filtering material, said first and second filtering materials having different porosities, said second filtering material having a finer porosity than said first filtering material and said second filtering material having an area equal to between about 10% and about 30% of a total area of said loop.

2. A filter as recited in claim 1, wherein said filtering materials are sheets.

3. A filter as recited in claim 2, wherein said filtering materials are folded in pleats.

4. A filter as recited in claim 3, wherein said filtering materials are made of filtration paper.

5. A filter as recited in claim 3, wherein said filtering materials are made of synthetic resin fibers.

6. A filter as recited in claim 3, wherein said filtering materials are made of cotton.

7. A filter as recited 1, wherein said first filtering material has a filtration porosity of more than 20 µm, and said second filtering material has a filtration porosity of less than 6 µm.

8. A filtration device for filtering hydraulic oil circulating in a hydraulic system comprising a filter case and a filter element provided inside said filter case, said filter element including a frame and a filter supported by said frame, said filter being formed in the shape of a loop and including a first filtering material surrounding a first portion of a central axis and having a pair of opposite edges extending axially with respect to said central axis, a second filtering material surrounding a remaining portion of said central axis and having a pair of opposite edges extending axially with respect to said central axis, first means for connecting one of the opposite edges of said first filtering material to one of the opposite edges of said second filtering material, and second means for connecting the other opposite edge of said first filtering material to the other opposite edge of said second filtering material to form a continuous loop of filtering material, said first and second filtering materials having different porosities, and said second filtering material having a finer porosity than said first filtering material, and said second filtering material having an area equal to between about 10% and about 30% of a total area of said loop.

9. A filtration device as recited in claim 8, wherein said filtering materials are sheets.

10. A filtration device as recited in claim 9, wherein said filtering materials are folded in pleats.

11. A filtration device as recited in claim 10, wherein said filtering materials are made of filtration paper.

12. A filtration device as recited in claim 10, wherein said filtering materials are made of synthetic resin fibers.

13. A filtration device as recited in claim 10, wherein said filtering materials are made of cotton.

14. A filtration device as recited in claim 8, wherein said first filtering material has a filtration porosity of more than 20 µm, said second filtering material has a filtration porosity of less than 6 µm.

* * * * *

UNITED STATES PATENT AND TRADEMARK OFFICE
CERTIFICATE OF CORRECTION

PATENT NO.   : 5,762,792
DATED        : June 9, 1998
INVENTOR(S)  : Kazuhiko Yamazaki It is certified that error appears in the above-identified patent and that said Letters Patent is hereby corrected as shown below:

In the Claims

In claim 12, line 1, immediately after "A", please delete "-" (dash).

Signed and Sealed this

Fifth Day of September, 2000

Attest:

Q. TODD DICKINSON

Attesting Officer

Director of Patents and Trademarks